Patented Nov. 25, 1930

1,782,857

UNITED STATES PATENT OFFICE

ERNEST B. MILLER AND GERALD C. CONNOLLY, OF BALTIMORE, MARYLAND, ASSIGNORS TO THE SILICA GEL CORPORATION, OF BALTIMORE, MARYLAND, A CORPORATION OF MARYLAND

PROCESS FOR OBTAINING A CATALYTIC GEL

No Drawing.   Application filed November 19, 1926.   Serial No. 149,523.

The present invention relates to a process of preparing catalytic agents comprising a hard porous gel with ultramicroscopic pores and catalytic material associated therewith.

In preparing highly adsorbent gels the solution obtained by mixing the ingredients is termed a "sol". If water is the solvent, then the solution is a "hydrosol". The viscosity of the sol gradually increases until finally it sets or hardens to a hydrogel. In appearance the hydrogel is similar to the jelly served as a dessert and contains over 90% of water. The hydrogel is then treated to remove the greater portion of this water as by evaporating the same, giving as a final product the gel which contains only a relatively small amount of water, say 3% to 12%, although this amount will depend upon the extent of the drying.

According to the present invention, the hydrogel after being suitably prepared and washed according to known methods, is immersed or brought in contact with a solution of an easily decomposable compound such as a metallic salt. The hydrogel will take up some of this solution. Thereafter the hydrogel is treated to remove the greater portion of its water to change its structure into the known, hard, highly porous gel. This may be done by evaporation. Then the gel is heated to a temperature sufficient to decompose the compound. If the compound is a metallic salt it will be decomposed into the corresponding oxide. If desired, it may be heated in a suitable reducing atmosphere to convert it into the metal or element.

The hydrogel, prepared in any suitable manner, must be such that is may be converted into the gel with the enormous number of exceedingly fine pores. These pores are so small that their dimension cannot be directly measured, so some other method must be resorted to for the purpose of determining whether or not the gel obtained from the hydrogel is suitable. One test which has proved satisfactory consists in ascertaining the amount of water vapor that the gel will adsorb at low partial pressures. The best gels have pores of such size and quantity that they will adsorb water vapor to such an extent as to contain about 41% of their own weight (dry) of water when in equilibrium with water vapor at 30° C. and a partial pressure of 22 mm. of mercury. However, hydrogels that will give gels containing a less number of small pores may be employed with some degree of success. It may be stated that about the lower limit is one wherein the gel will adsorb water vapor to such an extent as to contain not less than about 10% of its own weight (dry) of water when in equilibrium with water vapor at 30° C. and a partial pressure of 22 mm. of mercury.

The first step of the process consists in treating a hydrogel of the character described above, no matter how prepared, after it has been washed substantially free of acid and salts, or after being freed of soluble material, with a solution of a compound that is easily decomposed so that later on in the process, the compound may be decomposed to leave a component thereof associated with the resulting gel. The preferred method of treating the hydrogel with the solution is to immerse the hydrogel therein and allow it to so remain for at least half an hour. Thereafter the solution is drained off and the impregnated hydrogel is then ready to have the water removed therefrom.

Where the compound is a metallic salt, it is best to employ one that is easily decomposed to form the corresponding oxide at a moderate temperature, for example below 1000° F. In most instances, as for example in the cases of iron and copper catalysts, the nitrate salt has been found to be the most suitable, it being understood, however, that salts other than nitrate may be used. For example, a solution of ammonium vanadate is preferred where a catalyst consisting of a gel carrying vanadium oxide or vanadium is desired.

The concentration of the solution and the amount thereof employed, will vary in accordance with the amount of hydrogel being treated, the type of catalyst desired, and the amount of catalyst required in the final product. The concentration of the solution and the amount required may be calculated according to known formulæ.

As an example, the proportions for the preparation of a gel carrying 1% of copper oxide will be given. For this purpose a solution is made up that will contain 1.8% of copper nitrate containing six molecules of water of crystallization and having the formula $Cu(NO_3)_2 6H_2O$. Such a solution will analyze 0.50% calculated as copper oxide (CuO). The hydrogel is submerged in this solution for a period of a half hour or more, whereupon a substantial amount of copper nitrate will be taken up by the hydrogel. This is then removed for the further treatment. The spent solution, which now of course contains a smaller percentage of copper oxide, is made up again to its original strength by the addition of more copper nitrate and such solution may then be employed to treat more hydrogel. It will be understood that if it is desired to have the final product contain a higher percentage of copper oxide, a stronger solution of copper nitrate may be used, it being obvious that the strength and relative amounts employed will depend on the product desired.

The hydrogel, treated as just described, and containing the salt, now has the greater portion of the water removed therefrom in order to convert it into a highly porous hard gel. According to one method, this is accomplished by evaporating the water, as by means of a stream of air at 75° to 120° C. Thereafter the temperature may be slowly increased to 300° to 400° C. This temperature is usually insufficient to decompose the salt. It is preferred to decompose the salt in a subsequent step by heating, but it is to be understood that the drying and decomposing steps can be combined.

After the hydrogel has been dried, as stated above, to give the hard porous gel, it is heated to a temperature sufficient to decompose the impregnating salt into the oxide with the liberation of the other components of such salt as gases. In the case of the hydrogel impregnated with copper nitrate solution, the hard porous gel is heated to a temperature approaching 1000° F. to decompose the nitrate, leaving a deposit of copper oxide on all the surfaces of the gel, while the oxides of nitrogen escape in gaseous form.

If it is desired to prepare a catalytic agent consisting of the gel impregnated with, or carrying, the other component in a metallic or elemental form, rather than as an oxide, then the decomposing step as above described should be carried out in a reducing atmosphere of hydrogen, carbon monoxide, or the like, or in certain cases the drying and decomposing steps may be combined and take place in such an atmosphere.

The most suitable decomposing temperature will be determined by the nature of the impregnating material.

It will be understood that gels impregnated with other materials than those above mentioned may be prepared, such as a gel impregnated with iron oxide, aluminum oxide, manganese oxide, nickle oxide, as well as others, in each case the salt or compound most suitable for decomposition being employed. By heating the gel in a reducing atmosphere the catalytic agent consisting of the gel and a metal may be obtained, such as a gel impregnated with iron, nickle, silver, platinum, and the like.

The preferred product is a silica gel having the metal oxide or metal associated therewith but other impregnated gels may be secured, for example, those of tungstic oxide, stannic oxide, aluminum oxide, and the like, impregnated with a metallic oxide or metal. On account of the greater chemical inertness of silica gel, it is the preferred gel.

Furthermore, in place of a simple gel impregnated with the substance, impregnated plural gels may be obtained. For example, if a hydrogel consisting of the oxides of silicon and aluminum is treated in accordance with the present process, the final product will be a silica aluminum gel having the impregnated substance associated therewith. Likewise, by employing solutions of two or more salts a simple gel or plural gel impregnated with two or more substances may be secured.

The term "hydrogel" as employed in the claims designates the mass into which the hydrosol hardens or sets. Furthermore, the term is used to designate only such hydrogels as, when properly dried, will give as a product a hard porous gel having pores of such size that it will adsorb water vapor to such an extent as to contain not less than 10% of its own weight of water when in equilibrium with water vapor at 30° C. and a partial pressure of 22 mm. of mercury.

Having thus described the invention, what is claimed as new and desired to be secured by Letters Patent is:

1. The process of preparing a catalytic agent consisting in contacting a hydrogel with a solution of a substance capable of being converted by heat into a catalytic agent, converting the impregnated hydrogel into a hard, porous gel, and heating the gel to decompose the substance into a catalytic agent.

2. The process of preparing a catalytic agent consisting in contacting a hydrogel with a solution of a substance capable of being converted by heat into a catalytic agent, and heating the impregnated hydrogel to convert it into a hard porous gel and decompose the substance into a catalytic agent.

3. The process of preparing a catalytic agent consisting in contacting a hydrogel with a solution of a substance capable of being converted by heat into a catalytic agent, drying the impregnated hydrogel at a temperature insufficient to decompose the substance to thereby obtain a hard porous gel and thereafter heating the gel to a temperature sufficient to decompose the substance into a catalytic agent.

4. The process according to claim 1 wherein the hydrogel is that of silica.

5. The process of preparing a catalytic agent consisting in contacting a hydrogel with a solution of a metallic salt capable of being converted by heat into a catalytic agent, and heating the impregnated hydrogel to convert it into a hard, porous gel and decompose the salt into the oxide.

6. The process of preparing a catalytic agent consisting in contacting a hydrogel with a solution of a metallic salt capable of being converted by heat into a catalytic agent, drying the impregnated hydrogel at a temperature insufficient to decompose the salt to thereby obtain a hard, porous gel and thereafter heating the gel to a temperature sufficient to decompose the salt into a catalytic agent.

7. The process of preparing a catalytic agent consisting in contacting a hydrogel with a solution of a metallic salt capable of being converted by heat into a catalytic agent, drying the impregnated hydrogel at a temperature insufficient to decompose the salt to thereby obtain a hard, porous gel, and thereafter heating the gel in a reducing atmosphere at a temperature sufficient to decompose the salt into the metal.

8. The process of preparing a catalytic agent consisting in contacting a hydrogel of silica with a solution of a metallic salt capable of being converted by heat into a catalytic agent, and heating the impregnated hydrogel to convert it into a hard, porous silica gel and decompose the salt into a catalytic agent.

In testimony whereof we hereunto affix our signatures.

ERNEST B. MILLER.
GERALD C. CONNOLLY.